(12) United States Patent
Sampath et al.

(10) Patent No.: US 8,015,331 B2
(45) Date of Patent: Sep. 6, 2011

(54) MULTI-CONSOLE WORKSTATIONS CONCURRENTLY SUPPORTING MULTIPLE USERS

(75) Inventors: Sriram Sampath, Bellevue, WA (US); Ara Bernardi, Mercer Island, WA (US); Mohamed Bouchet, Redmond, WA (US); John E. Parsons, Sammamish, WA (US); Makarand V Patwardhan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 487 days.

(21) Appl. No.: 11/171,005

(22) Filed: Jun. 29, 2005

(65) Prior Publication Data
US 2007/0005693 A1    Jan. 4, 2007

(51) Int. Cl.
G06F 13/14 (2006.01)
(52) U.S. Cl. .......................................... 710/62; 715/750
(58) Field of Classification Search .................. 709/204, 709/231, 224, 217, 227; 725/38; 710/316, 710/2, 36, 62, 64, 72; 345/1.1, 179, 2.1; 361/683; 463/42; 713/168
See application file for complete search history.

(56) References Cited

U.S. PATENT DOCUMENTS

| | | | | |
|---|---|---|---|---|
| 5,678,002 A * | 10/1997 | Fawcett et al. | ................ | 715/709 |
| 6,212,584 B1 * | 4/2001 | Nei | ................ | 710/72 |
| 6,256,014 B1 * | 7/2001 | Thomas et al. | ................ | 345/163 |
| 6,652,378 B2 * | 11/2003 | Cannon et al. | ................ | 463/20 |
| 6,718,415 B1 * | 4/2004 | Chu | ................ | 710/301 |
| 7,099,981 B2 * | 8/2006 | Chu | ................ | 710/301 |
| 7,146,446 B2 * | 12/2006 | Chu | ................ | 710/301 |
| 7,328,297 B2 * | 2/2008 | Chu | ................ | 710/301 |
| 7,363,415 B2 * | 4/2008 | Chu | ................ | 710/313 |
| 7,363,416 B2 * | 4/2008 | Chu | ................ | 710/313 |
| 7,376,779 B2 * | 5/2008 | Chu | ................ | 710/313 |
| 2004/0201628 A1 * | 10/2004 | Johanson et al. | ................ | 345/764 |
| 2005/0044186 A1 * | 2/2005 | Petrisor | ................ | 709/219 |
| 2005/0066000 A1 * | 3/2005 | Liaw et al. | ................ | 709/204 |
| 2005/0132403 A1 * | 6/2005 | Lee et al. | ................ | 725/38 |
| 2006/0230110 A1 * | 10/2006 | VanHarlingen et al. | ...... | 709/205 |

OTHER PUBLICATIONS

Schmid, Jetway's 915P-Twin Mobo: One PC, Two Users, Tom's Hardware, Nov. 2004.*
Fink, Jetway Magic Twin MiniQ Computer, AnadTech, Apr. 2004.*
Microsoft, How Terminal Services Works, Microsoft Technet, Mar. 2003, pp. 1-14.*
Intel, Intel Direct Platform Control Console User's Guide, 2003, Intel, pp. 1-10.*
Microsoft, Mobile Computing with Windows XP, 2001, Microsoft TechNet, pp. 1-13.*
Microsoft, Microsoft Computer Dictionary, 2002, Microsoft Press, 5th edition, pp. 445-446.*
NC Computing Model; 1 page.
Trott; Microsoft: backing the NC without actually backing the NC; http://www.computerworld.co.nz/news.nsf/PrintDoc/CC256CED0016A. . . printed Jun. 9, 2005; 1 page.

(Continued)

*Primary Examiner* — Cheng-Yuan Tseng
(74) *Attorney, Agent, or Firm* — Lee & Hayes, PLLC

(57) ABSTRACT

A workstation including a host machine and a plurality of consoles directly connected to the host machine. Each of the consoles are configured as a separate console, and each of the consoles include a respective input device adapted to receive input from a user and a respective output device adapted to provide output to the user. A method provided herein includes configuring the host machine to support a plurality of users concurrently on a plurality of consoles, and connecting each of the consoles directly to the host machine so as to enable direct communication therebetween.

16 Claims, 13 Drawing Sheets

OTHER PUBLICATIONS

Key; "Native NT Applications on HP-UX: A Comparison of Software Options"; http://www.hpworld.com/pubcontent/hpuxusi/jun98/01key.htm.; 8 pages; printed Jun. 9, 2005.

IGC Corporate History; http://www.igcinc.com/history.htm; 2 pages; printed Jun. 9, 2005.

Enck; "Many Users, Many Products"; http://www.windowsitpro.com/Articles/Print.cfm? ARticleID=3443; 3 pages; printed Jun. 9, 2005.

IGC Press Release; Prologue Software Acquires IGC; http://www.igcinc.com/prologue.htm.; printed Jun. 9, 2005; 2 pages.

Jacobs; "Thin clients"; Computerworld; http://www.computerworld.com/printthis/1998/0,4814,43491,00.html; 4 pages; printed Apr. 5, 2005.

HP Multi-User PC Sparks Debate; http://www.wired.com/news/inforstructure/0,1377,64163,00.html; Jul. 10, 2004; printed Apr. 5, 2005.

Maxspeed Management Software; 2 pages.

http://www.maxspeed.com/products/specifications.aspx?ID=64; printed Jun. 9, 2005; 3 pages.

http://www.maxspeed.com/pressroom/release/news.aspx?ID-22; printed Jun. 9, 2004; 2 pages.

http://www.maxspeed.com/pressroom/release/news.aspx?ID=21; Maxspeed Announces its New PGX 2000 Ultra-thin Client; 2 pages; printed Jun. 9, 2005.

http://www.maxspeed.com/pressroom/story/news.aspx?ID=5; Hospital Systems; 2 pages; printed Jun. 9, 2005.

http://www.maxspeed.com/pressroom/release/news.aspx?ID=14; Maxspeed's Maxstation is First Linux Desktop Device Certified by Linux; printed Jun. 9, 2005.

Ultra-Thin Client—Client/Server' Architecture; 3 pages.

hppt://www.windowsitpro.com/Atricles/Print.cfm?ArticleID=3163; John Enck, InstantDoc #3183; Mar. 1998; 11 pages; printed Jun. 9, 2005.

http://www.windowsitpro.corn/Articles/Print.cfm?ArticleID=521; Mark Smith, InstantDoc #521, Sep. 1997; 14 pages, printed Jun. 9, 2005.

http://www.ncns.com/news/997/prologue.html; GraphOn Corp. and Prologue Software To Merge To Create Global Force In Thin-Client Multi-User OS Computing; Sep. 16, 1997; 3 pages, printed Jun. 9, 2005.

\* cited by examiner

MULTI-CONSOLE WORKSTATIONS CONCURRENTLY SUPPORTING MULTIPLE USERS

BACKGROUND

When a user logs in to use a given personal computer system, the operating system running on that computer system establishes a session for that user. Conventional operating systems running on computer systems typically support only one session, regardless of how many monitors and display devices are attached to the computer system or are present in the computer system. Also, conventional computer systems usually provide only one physical console for a user. Generally, in the context of conventional personal computer systems, only one local user can access the computer system at a time.

Technology such as Fast User Switching (FUS) supported by the WINDOWS® XP® operating system, provided by Microsoft Corporation, allows multiple users to access a computer system through respective user accounts. However, FUS does not allow these multiple users to access the computer system simultaneously, and only one user session can be active at a time. In the FUS context, only one user can log-in to the machine at a time, and this user must log out before a second user can log in.

Other technology such as Terminal Services (TS), supported by various versions of the WINDOWS® family of operation systems, allows multiple users to access a computer system concurrently. However, TS is a thin-client solution, and uses a network to connect a host machine to a plurality of terminals on which information is displayed to the users. While the network does enable multiple users to access the host machine concurrently, it can also be a performance bottleneck that constrains the types of applications that the users can run on the terminals. Some applications require real-time, high-bandwidth multi-media capabilities, such as gaming, audio or video streaming, or other types of graphics-intensive applications. For such applications, the performance of a thin-client solution or any other solution involving or deployed over a network may not be entirely satisfactory, because the demands of such applications may exceed the performance capabilities of the network.

SUMMARY

Embodiments of a workstation provided herein include a host machine and a plurality of consoles directly connected to the host machine. Each of the consoles is configured as a separate console accessible to a given user. Each of the separate consoles includes a respective input device adapted to receive input from the user, and a respective output device adapted to provide output to the user. The input device and the output device are connected directly to the host machine.

Because the consoles, which include the input device and the output device, are connected directly to the host machine without intermediate components or communication networks therebetween, users logging into the consoles can access the resources of the host machine with a minimum of performance degradation between the consoles and the host machine. Thus, these users can execute a wider array of bandwidth- and/or graphics-intensive applications on the consoles than would be possible if the consoles were connected to the host machine via a network.

Embodiments of a method provided herein includes configuring the host machine to support a plurality of users concurrently on a plurality of consoles, and connecting each of the consoles directly to the host machine so as to enable direct communication therebetween.

This Summary is provided to introduce a selection of concepts in a simplified form that are further described below in the Detailed Description. This Summary is not intended to identify key features or to essential features of the claimed subject matter, nor is it intended to be used as an aid in determining the scope of the claimed subject matter.

BRIEF DESCRIPTIONS OF THE DRAWING FIGURES

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION OF ILLUSTRATIVE EMBODIMENTS

Figure 1:
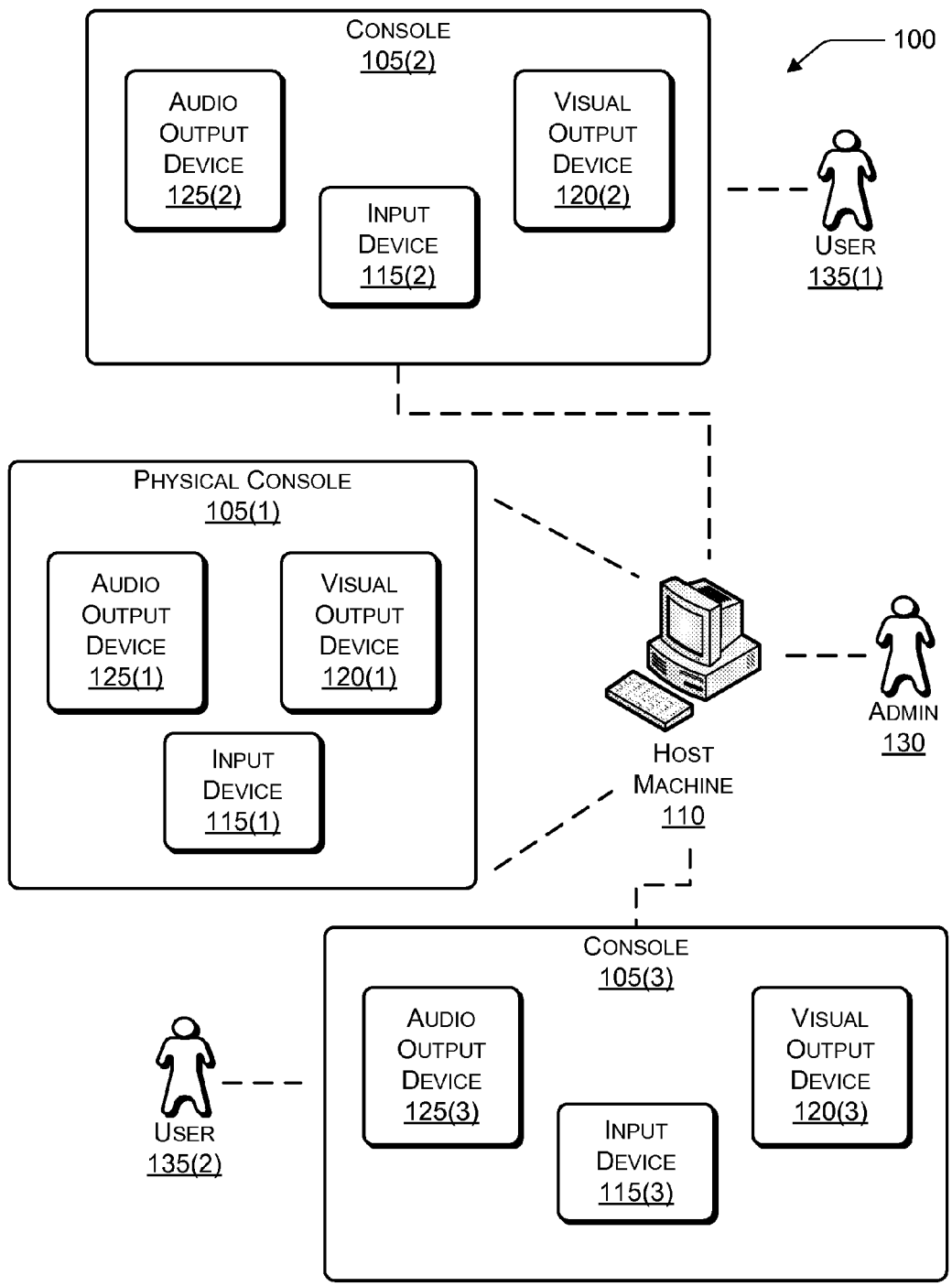
FIG. 1 is a block diagram illustrating a multi-console, multi-user workstation system.
Figure 13:
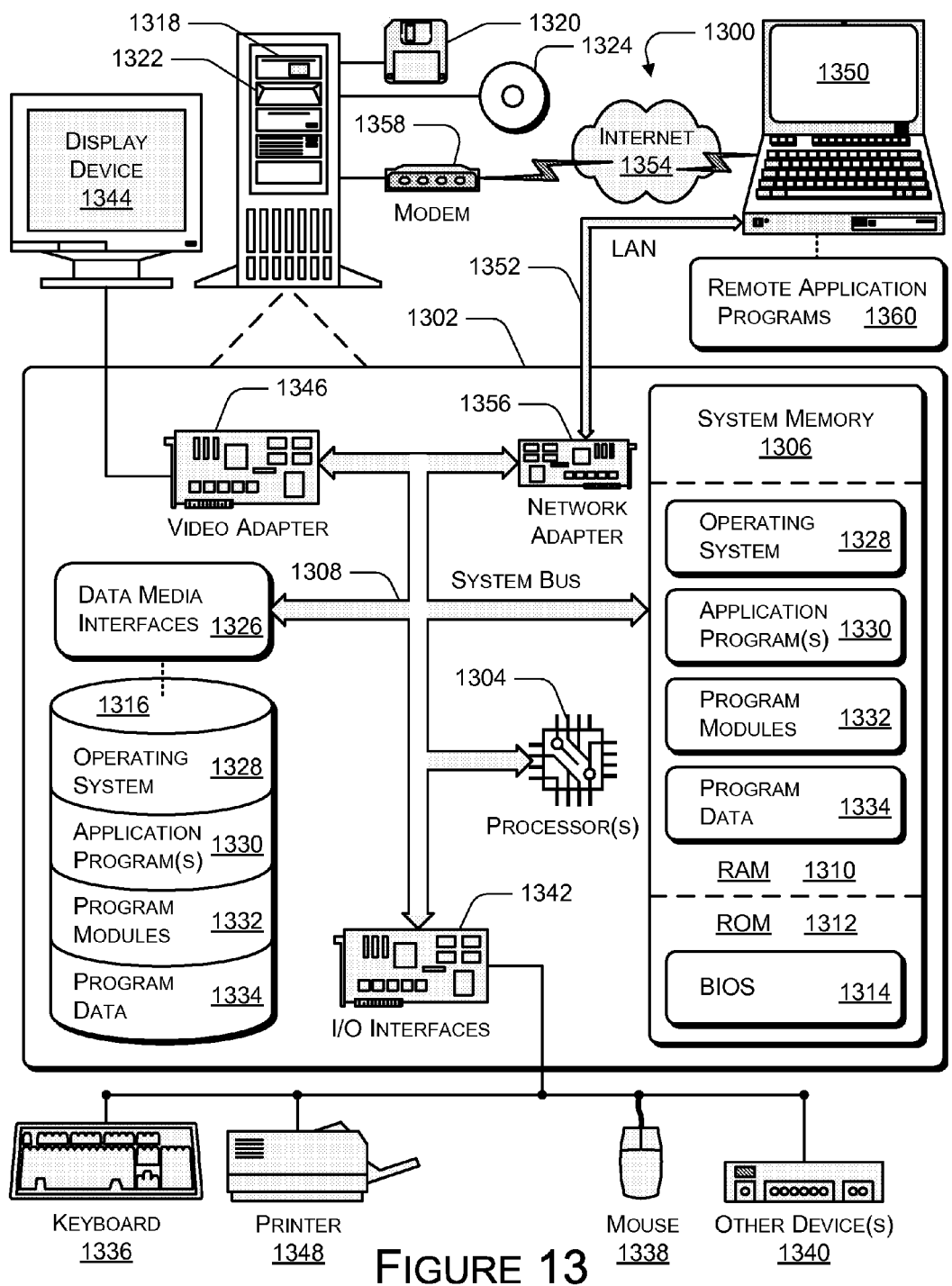
FIG. 13 is a block diagram of an illustrative computing environment within which the teachings herein can be either fully or partially implemented.

FIG. 1 illustrates a multi-console system 100, with a plurality of consoles 105 or workstations 105 connected directly to a host machine 110. For example, the host machine 110 can be connected to the consoles 105 through device ports or other connection points provided by the hardware of the host machine 110 itself. Host machine 110 can be implemented as a personal computer (PC) running any of the WINDOWS® family of operating systems, along with suitable application software chosen for a given implementation. FIG. 13 illustrates components and architecture suitable for implementing the host machine 110.

The host machine 110 typically includes one physical console 105(1), comprising input devices 115(1) and output devices 120(1) and 125(1) to enable an administrator 130 (hereafter admin 130) or other authorized users to log in to the host machine 110. Using the physical console 105(1), the admin 130 can initially configure the additional consoles 105(2) and 105(3). Also, the admin 130 or other authorized users can log in to the host machine 110 via the physical console 105(1) to access the resources of the host machine 110.

The physical console 105(1) and the additional consoles 105(2) and 105(3) contain at least a minimal configuration of output devices 120 and 125 and input devices 115 appropriate to enable respective users 135 to access the resources of the host machine 110. A given console 105 can include visual output device 120 and/or audio output device 125.

A visual output device 120 suitable for a given physical console 105(1) or additional consoles 105(2) and 105(3) can include any monitor incorporating any display technology appropriate for a given application. Also included, but omitted from FIG. 1 for clarity, are one or more video cards, and drivers associated with these cards. It is noted that enhanced video cards may enable connection of more than one visual output device 120 to the card. Therefore, more than one additional console 105 may be supported using one such enhanced video card.

The physical console 105(1) and/or the additional consoles 105(2) and 105(3) can also include audio output devices 125 such as speakers, headphones, ear phones, ear buds, or the like. Combined with a corresponding monitor or other visual output device 120, these audio output devices 125 can enable respective users 135 at the consoles 105 to, for example, view different movies, play different games, or run different applications at each console 105.

Illustrative input devices 115 for the physical console 105(1) and/or the additional consoles 105(2) and 105(3) can include respective instances of a keyboard, mouse, or any other device by which a user 135 can provide commands or input to the host machine 110. Other sources of input can include digital cameras, webcams, microphones, or the like, along with any cards or drivers appropriate for interfacing such devices to the host machine 110.

Each console 105 is supported by any software (e.g., device drivers) appropriate to support or enable full use of the input devices 115 or output devices 120 and 125 included as part of the consoles 105. If any of the peripherals connected to the host machine 110 are serial devices, technology such as Universal Serial Bus (USB) may be useful to connect these peripherals.

The direct connection to the hardware of the host machine 110 enables each of the consoles 105 to provide superior performance as compared to thin-client or network-based solutions, especially for graphic intensive applications. Since the additional consoles 105 do not communicate through a network, network bandwidth limitations do not constrain or degrade the performance of the additional consoles 105. Thus, the additional consoles 105 can perform to the full capability permitted by the resources of the host machine 110. Accordingly, the host machine 110 can be provisioned to support whatever applications are expected to be offered to the users 135, and to support the number of additional consoles 105 and users 135 configured by the admin 130.

The multi-console system 100 further overcomes shortcomings of conventional systems, which typically limited each host machine to hosting only one physical console and only one session with one user 135. A "session" as used herein refers to a connection between a given user 135 and the host machine 110. The hardware resources that are allocated to the given user 135 are associated with that user's session. If additional input devices 115 and output devices 120 and 125 are attached to the host machine 110, then these additional input devices 115 and output devices 120 and 125 can be grouped into additional consoles 105 that can support additional sessions with users 135. Put another way, each console 105 can be associated with a respective set of input devices 115 and output devices 120 and 125. Each console 105 in turn can support a session with a user 135.

For convenience and clarity, FIG. 1 shows the host machine 110 supporting two additional consoles 105(2) and 105(3). However, the multi-console system 100 can be readily be practiced with N additional consoles 105, where N is an integer greater than zero. In the non-limiting embodiment shown in FIG. 1, N equals two. When a given user 135 logs in to a given console 105, a corresponding session is allocated to that user 135. In this manner, N additional users 135 can access the resources of the host machine 110 simultaneously.

In this sense, the multi-console system 100 can be viewed as extending technology such as FUS to support a plurality of concurrent or simultaneous sessions with a plurality of users 135. Since these user sessions are local to the host machine 110 and not remote, they do not depend on protocols such as the Remote Desktop Protocol (RDP). Further, neither the host machine 110 nor the additional consoles 105(2) and 105(3) need to be connected to additional network-related hardware, thereby avoiding the cost of such hardware. Finally, because the consoles 105 are connected directly to the hardware of the host machine 110 (i.e., directly to ports or cards that are connected to the bus of the host machine), these user sessions are not encumbered by network overhead. By avoiding the performance bottlenecks of networks, the multi-console system 100 can support the bandwidth and performance demands of applications that might overwhelm network connections.

The multi-console system 100 also reduces the total cost of ownership associated with enabling multiple users 135 to access the host machine 110 concurrently. For example, in residential, home business, or small business scenarios, instead of installing and managing an application that is deployed onto multiple separate, standalone machines, an admin 130 can install the application only onto the host machine 110. The multi-console system 100 then enables the host machine 110 to support N additional, separate consoles 105, and can support N different sessions and N different users 135 simultaneously. Thus, each user 135 can access the single instance of the application as if it were installed on the user's own standalone machine.

Figure 2:
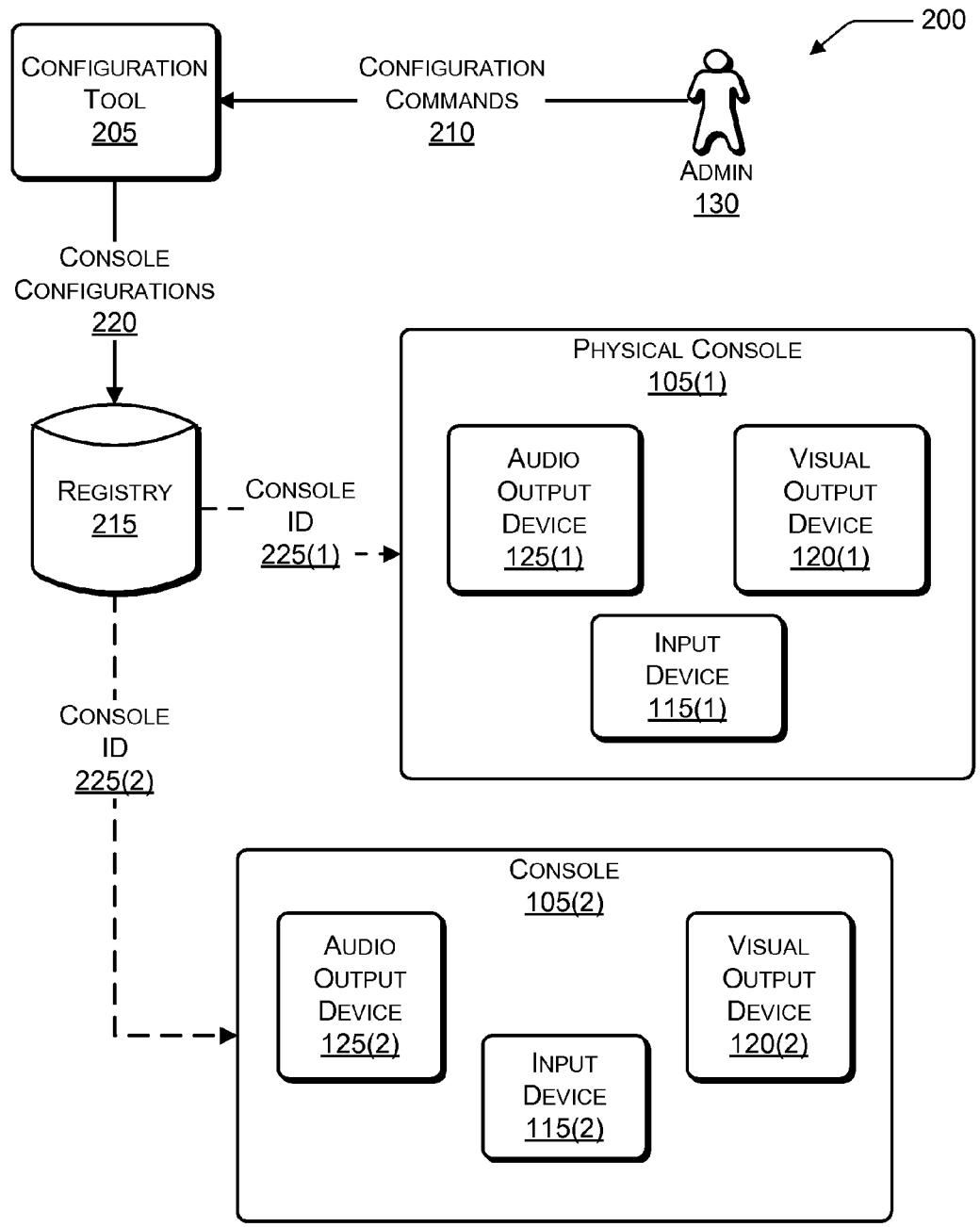
FIG. 2 is a diagram showing data flows and components related to initially configuring the multi-console system shown in FIG. 1.

FIG. 2 illustrates a data flow 200 and related components associated with initially configuring the multi-console system 100 shown in FIG. 1. The multi-console system 100 provides a configuration tool 205 that is used by the admin 130 to configure the host machine 110. As an initial step the admin 130 issues configuration commands 210 that logically group various input devices 115 and output devices 120 and 125 together into consoles 105. In turn, these consoles 105 can support different sessions with respective users 135. The grouping of the input devices 115 and the output devices 120 and 125 into respective consoles 105 is represented in the console configuration data 220.

The configuration commands 210 from the admin 130 are stored in a registry 215 or other data store. The registry 215 stores the console configuration data 220 that logically defines each of the consoles 105, and associates respective output devices 120 and 125 and input devices 115 with each console 105. Each console 105 supported by the host machine 110 is assigned a unique console ID 225. FIG. 2 shows a non-limiting embodiment of two consoles 105(1) and 105(2) with corresponding console IDs 225(1) and 225(2). The registry 215 is indexed or keyed at least by this console ID 225, so that given an input console ID 225, the registry 215 can readily return data representing all input devices 115 and output devices 120 and 125 assigned to or associated with the input console ID 225. The unique console IDs 225 for the physical console 105(1) and the additional console 105(2) are represented generally by the dashed lines 225(1) and 225(2) appearing in FIG. 2.

The above configuration processes are performed for each of the N additional consoles 105 supported by a given instance of the multi-console system 100. When the admin 130 has finished configuring the N additional consoles 105, the host machine 110 may be rebooted or restarted if necessary. After configuration is complete, the multi-console system 100 is ready to accept logins from users 135.

Figure 3:
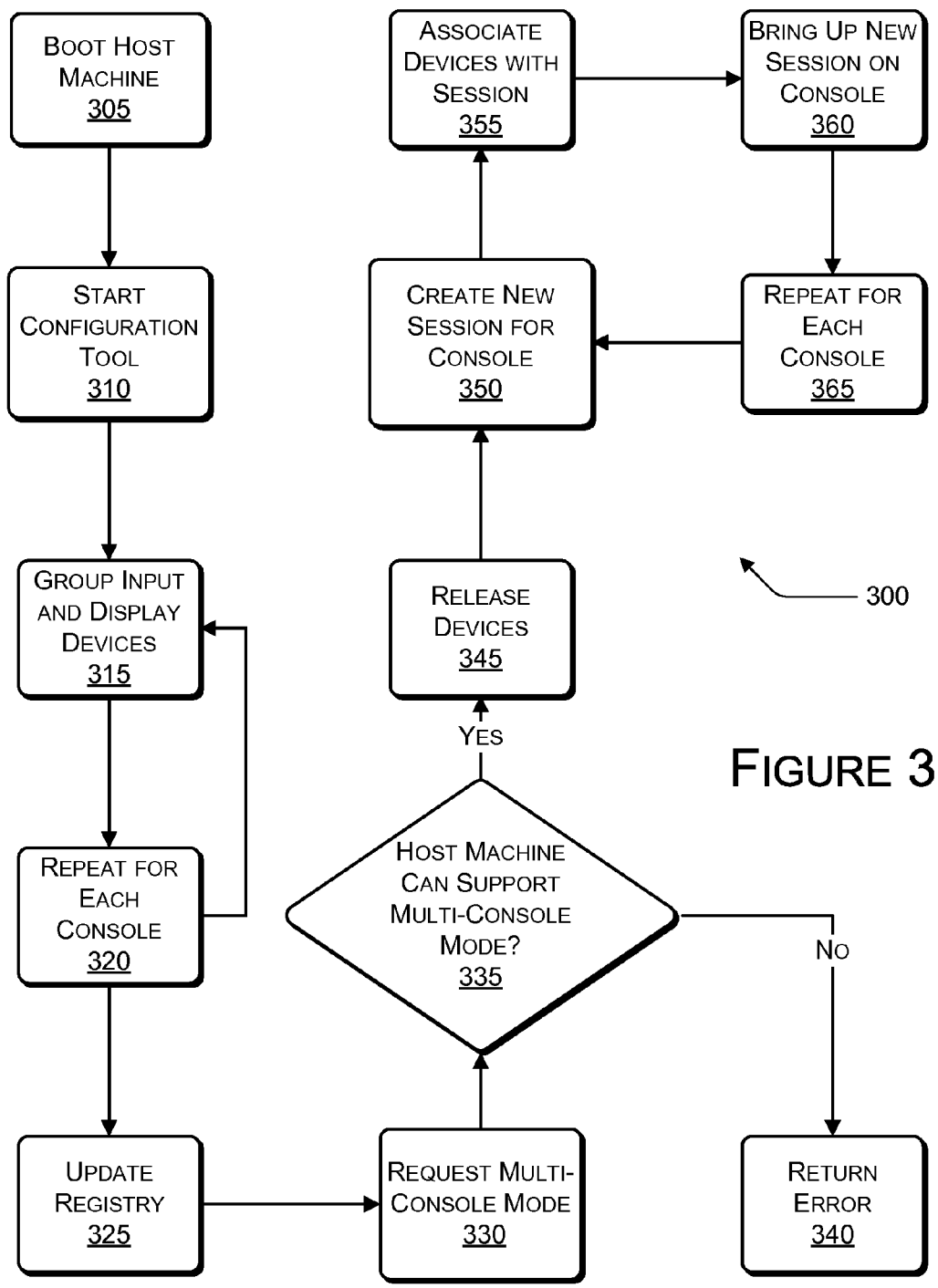
FIG. 3 is a flowchart illustrating a process performed by the multi-console system when configuring consoles and initializing multiple-console capability for the first time on a given host machine.

FIG. 3 illustrates a process 300 performed by the multi-console system 100 when initializing multiple-console capability for the first time on a given host machine 110. To simplify the discussion, but not to limit the teachings herein, assume that the given host machine 110 is equipped with two video cards, two monitors, two keyboards, and two mice. Assume further that the registry 215 reflects this environment. It is noted that this discussion can be easily extended to N instances of the above devices, with N being any number greater than 0.

When the host machine 110 first boots up (block 305), it will typically be in multiple-monitor mode, which means that only a single user 135 on the host machine 110 can view displays on multiple monitors connected to the host machine 110. Multiple monitor mode is distinguished herein from multiple console mode. The host machine 110 in multiple-monitor mode hosts only one interactive session, which is labeled as the "first interactive session" for ease of reference. The first interactive session is associated with the physical console 105(1) supported by the host machine 110 when in multiple-monitor mode, and all the input devices 115 and output devices 120 and 125 connected to the host machine 110 are owned and used by the first interactive session.

The admin 130 then starts the configuration tool 205 (block 310), which reads the registry 215 and learns that there are two monitors, two keyboards, and two mice connected to the host machine 110. Each of the above devices are referenced or identified to facilitate grouping them into logical groups of devices or consoles 105 (block 315). How the devices are identified or referenced can depend on the nature of the particular devices. For output devices 120 and 125 such as monitors, the WINDOWS® family of operating systems provides a "multimon" utility and related user interface (UI) that can display the numbers "1" and "2" in the respective monitors, so that the admin 130 can identify and reference each monitor separately when issuing configuration commands 210.

Input devices 115 such as a keyboard or mouse can be represented in the UI by appropriate icons. For such input devices 115, the admin 130 can touch a key on the keyboard or move the mouse, and in response the UI can activate, move, or otherwise change the state of the icon. Alternatively, the different input devices 115 (e.g., keyboards, mice, or the like) can be listed by their Globally Unique Identifiers (GUIDs). However, GUIDs may be difficult for human admins 130 to understand.

Using the configuration tool 205, the admin 130 logically groups a set of input devices 115 and output devices 120 or 125 (comprising, e.g., a monitor, keyboard, and mouse) as a first console 105 at block 315. For each console 105 supported by the host machine 110, the admin 130 repeats the foregoing processes (block 320), logically grouping additional sets of input devices 115 and output devices 120 or 125 (comprising, e.g., another monitor, keyboard, and mouse) into additional consoles 105. The configuration tool 205 records data in the registry 215 representing these consoles 105 and the devices assigned thereto, and stores in the registry 215 a unique console ID 225 for each console 105 (block 325).

The configuration tool 205 then requests that the host machine 110 be switched from "multi-monitor" mode to "multi-console" mode (block 330). The configuration tool 205 can make this request in response to the admin 130 clicking on a function such as "Start Different Console Sessions with These Associated Devices" provided by the configuration tool 205.

In block 335, the process 300 performs various checks to ensure that the host machine 110 can support multi-console mode. Such checks can include ensuring that the hardware connected to the host machine 110 can support multi-console mode. For example, the process 300 can check that the host machine 110 is connected to two different output devices 120 and 125, and to two sets of input devices 115.

Another check can include ensuring that these two monitors are not configured to be part of the same display device. For example, the WINDOWS® XP® operations system offers "Dualview" feature that allows multiple monitors to be connected to a given machine in a multi-monitor, single-console environment. However, if each of these multiple monitors is attached to a given console, then these multiple monitors may not be sufficient to support the multi-console environment taught herein.

Another check might involve ensuring that the admin 130 permits configuring and running the host machine 110 in multi-console mode. The admin 130 may have established a policy on the host machine 110 barring it from being run in multi-console mode.

If the host machine 110 cannot be configured and/or run in multi-console mode, then an appropriate error message or indication is returned to the configuration tool 205 (block 340). Otherwise, if the host machine 110 can be configured in multi-console mode, then existing ownership rights to the output devices 120 or 125 and input devices 115 are relinquished or released (block 345). More particularly, the process 300 can request that any operating system component associated with the first interactive session remove all references to its input devices 115 and output devices 120 or 125, besides those input devices 115 or output devices 120 or 125 allocated in the registry 215 to the first interactive session running on the physical console 105(1).

In response to this request, these operating system components related to the first interactive session remove any reference to any output devices 120 or 125, besides the output devices 120 or 125 allocated in the registry 215 to the first interactive session. Similarly, these operating system components remove any reference to any input devices 115 (e.g., keyboard and mouse), besides the input devices allocated to the first interactive session in the registry 215.

In block 350, a new session is created to associate with a given new console 105. This new session may be viewed as a temporary session in the sense that it runs on the console 105 awaiting an actual user login. As described further below, when the user logs on, the temporary session transitions to a live or active user session after the logon is complete. A unique session identifier is created for the new session, and can be loaded into the registry 215 so as to associate the session with the corresponding console 105. This temporary session may have the characteristics of the user sessions shown below in FIGS. 4 and 5, so all of those teachings apply equally to the user sessions discussed below in FIGS. 4 and 5.

Recall that after the console configuration process described above in connection with FIG. 2, the registry 215 associates each console 105 with corresponding output devices 120 or 125 and input devices 115. Further, since a new session is being created for each console 105, the output devices 120 or 125 and input devices 115 for each console 105 will, in turn, be associated with a session created for that console 105. As discussed above, the configuration tool 205 creates entries in the registry 215 in response to commands from the admin 130 when the admin 130 configures the various consoles 105. These entries associate each console 105 with the input devices 115 and output devices 120 or 125 assigned to that console 105 by the admin 130.

In block 360, the new temporary session comes up on the console 105, and the input devices 115 are activated to receive input from a user 135 when that user 135 seeks to login to the console 105. The output device 120 or 125 is now responsive to commands issued by the user 135, for example, through the input devices 115. In block 365, the above processes are repeated for each of the other new consoles 105 configured by the admin 130, returning to block 350 for each new console 105.

Figure 4:
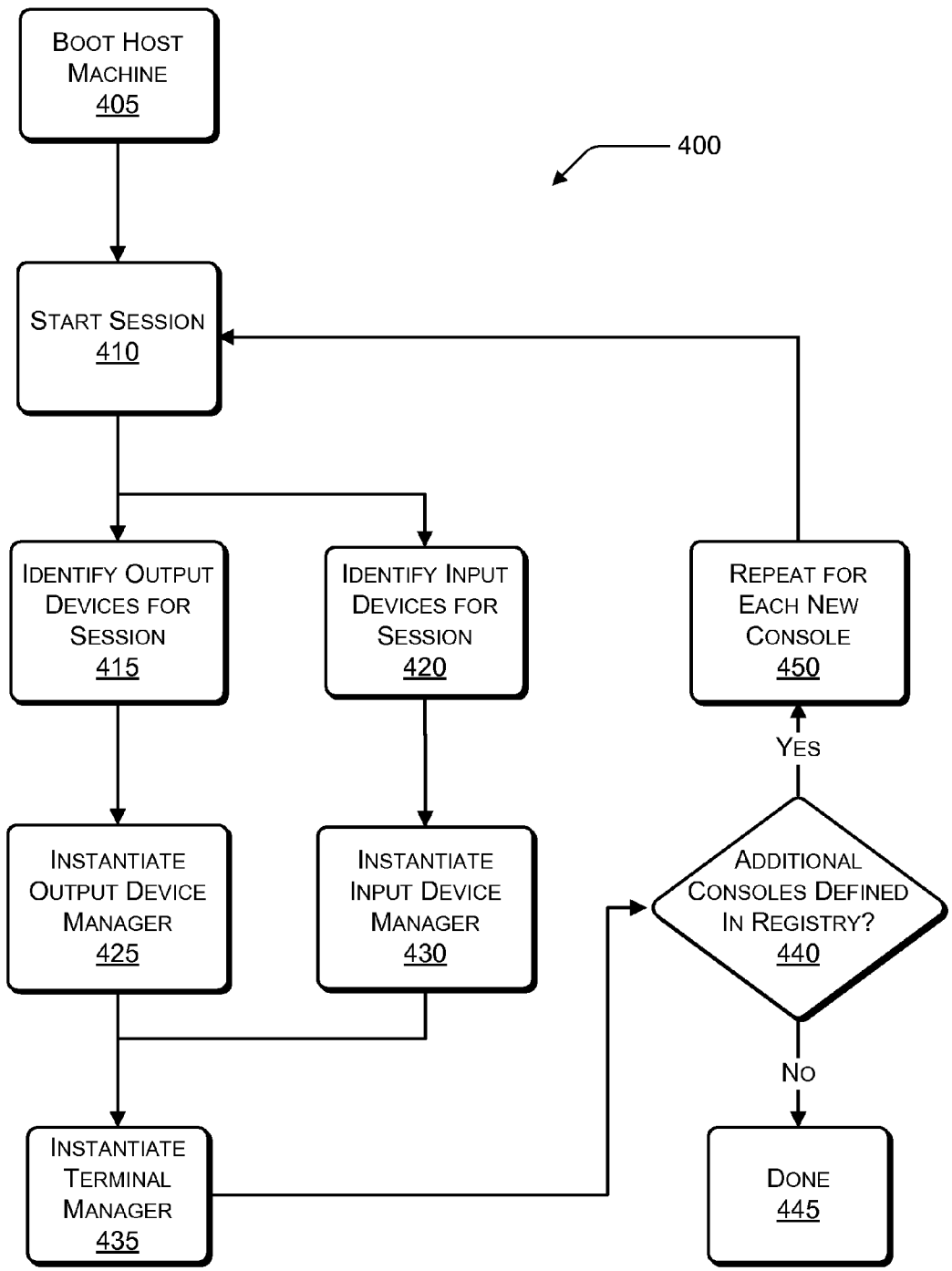
FIG. 4 is a flowchart illustrating a process performed when the host machine is booted or restarted after the consoles have been configured as shown in FIG. 3.

FIG. 4 illustrates a process flow 400 performed when the host machine 110 is booted or restarted (block 405) after the new consoles 105 have been configured as shown in FIG. 3. In block 410, a new session is created for the first interactive session created by default when the host machine 110 boots. In blocks 415 and 420, the registry 215 is read to identify the output devices 120 or 125 and the input devices 115 assigned to this first interactive session. Recall that the configuration tool 205 created these entries in the registry 215 for the first interactive session when the admin 130 configured the additional consoles 105. It is noted that while blocks 415 and 420 are illustrated separately for clarity and convenience, the processing performed therein could be integrated, and/or be performed serially or in parallel relative to one another, or any combination of the foregoing.

In blocks 425 and 430, an output device manager and an input device manager (illustrated in FIG. 5 and described in connection therewith) are each instantiated for the first interactive session. As before with blocks 415 and 420, while blocks 425 and 430 are illustrated separately for clarity and convenience, the processing performed therein could be integrated, and/or be performed serially or in parallel relative to one another, or any combination of the foregoing.

In block 435, a terminal manager for the first interactive session is started. The processing performed by the terminal manager is described in greater detail below in FIG. 5. In block 440, the terminal manager reads the registry 215 as written by the configuration tool 205 during setup, and determines whether additional consoles 105 have been configured and specified in the registry 215. If not, the process 400 completes at block 445.

If additional consoles 105 are defined in the registry 215, the foregoing processes are repeated for each additional console 105 defined in the registry 215 (block 450). Returning to block 410, a new temporary session is started for the next one of the additional consoles 105. The above processes are repeated for each additional console 105 specified in the registry 215. When a user 135 logs in to the console 105, a new session is created for that user 135, and the new session is associated with the console 105.

Figure 5:
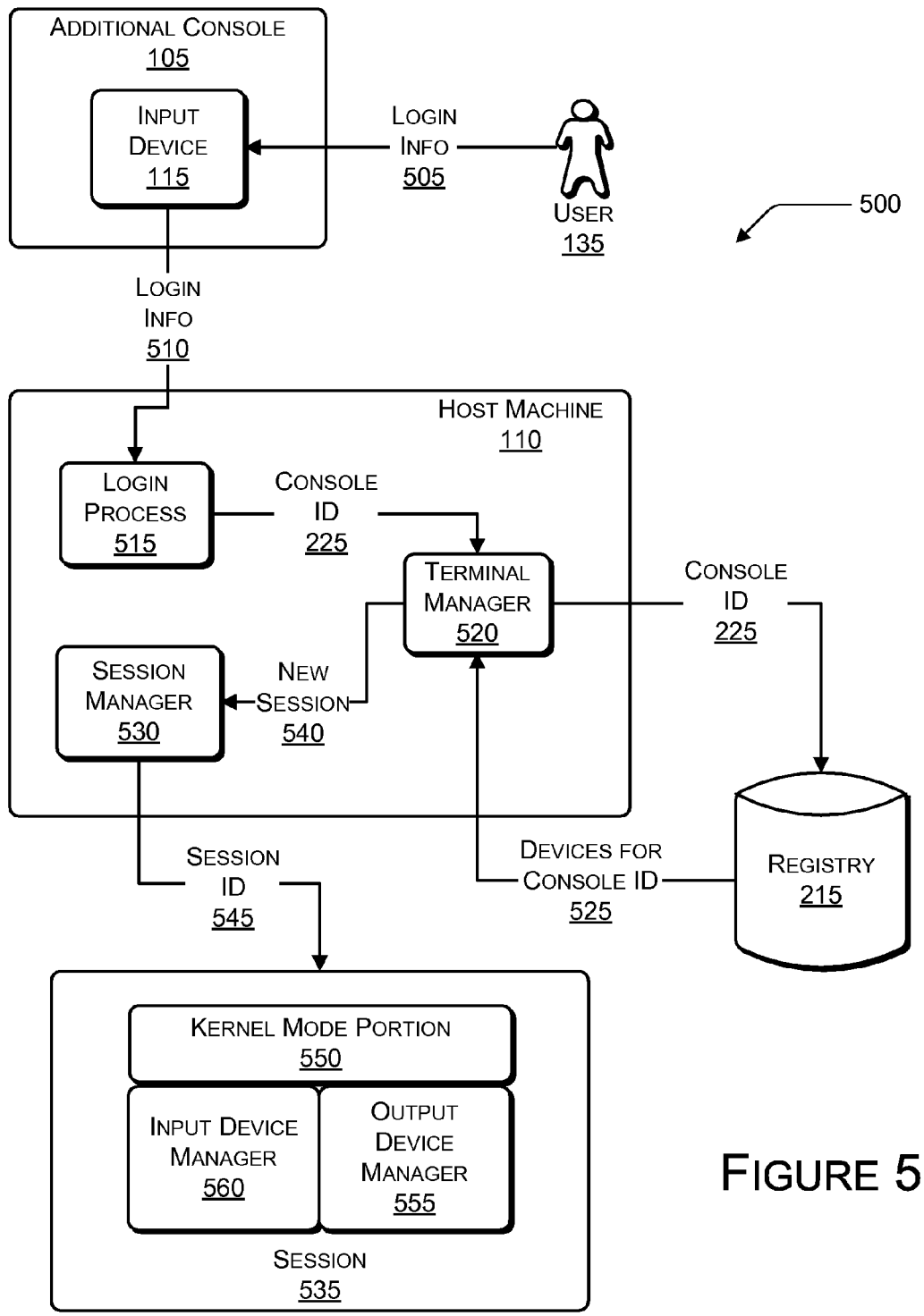
FIG. 5 is a diagram showing data flows and components related to logging users into the multi-console system shown in FIGS. 1 and 2.

FIG. 5 illustrates a data flow 500 and related components associated with logging users 135 into the multi-console system 100 shown in FIGS. 1 and 2. When a given user 135 wishes to login to the multi-console system 100, he or she chooses a given console 105 provided by the host machine 110 and previously configured by the admin 130. The given console 105 includes an input device 115, and the user 135 submits login information 505 via the input device 115. The login information 505 typically includes a username and password as submitted by the user 135. The login information 510 output from the input device 115 includes the username and password, but may also include a console identifier 225 that indicates the console 105 that the user 135 has selected.

The host machine 110 runs a login process 515 that receives the login information 510. A suitable example of the login process 515 is the WINLOGON process provided by the WINDOWS® family of operating systems offered by Microsoft. Generally, the login process 515 is responsible for securely logging authorized users 135 onto the host machine 110 to access one of the consoles 105.

Assuming the user 135 is authenticated and the login information 505/510 is valid, the login process 515 passes the console identifier 225 to a terminal manager 520, and asks the terminal manager 520 to create a new session 535 for the user 135. As an optimization discussed further below, the new session 535 can be created ahead of time as a "temporary" session 535 that is associated with the console identifier 225. These temporary sessions 535 may be created on boot-up to await user login. This optimization can save the time associated with creating the new session 535 from scratch when the user 135 logs in.

The terminal manager 520 is a server-side component that manages the different sessions 535 that result when different users 135 login to the various consoles 105. The WINDOWS® family of operating systems offers a suitable example of a terminal manager 520 in the form of the Terminal Services (TS) service, which may be extended to support the multi-console aspects of the multi-console system 100. The session management tasks performed by the terminal manager 520 can include starting sessions 535 up, tearing sessions 535 down, disconnecting users 135 from sessions 535, reconnecting users 135 to sessions 535, and the like.

Given the console identifier 225, the terminal manager 520 knows which console 105 the user 135 is accessing. The terminal manager 520 then accesses the registry 215 using the console identifier 225 as a key. The registry 215 returns data 525 indicating which input devices 115 and/or output devices 120 or 125 are assigned to the console 105 corresponding to the input console identifier 225. The data 525 can be a list of the input devices 115 and the output devices 120 or 125 assigned to the console 105 by the admin 130 when the admin 130 configured the console 105. The terminal manager 520 now knows which input devices 115 and output devices 120 or 125 are associated with the console 105 to which the user 135 is connected, and therefore which devices are to be allocated to the user 135.

The terminal manager 520 then requests that a session manager 530 create the new session 535 for the user 135, as represented by the line 540. The session manager 530 creates new sessions 535 for users 135 upon command from the terminal manager 520. As noted elsewhere herein, the sessions 535 may have been created ahead of time to await user login at a given console. When the user 135 logs off, the session 535 may be torn down and replaced with a temporary session 535 to await login from a next user 135. When the next user 135 logs in, this temporary session 535 can become his or her active session 535, unless that user 135 has a disconnection session 535 from before. A suitable example of the session manager 530 is the Session Manager process, known as SMSS, in the WINDOWS® family of operating systems.

In response to the request 540 from the terminal manager 520, the session manager 530 creates the new session 535, which is associated with the console 105 to which the user 135 is connected. The new session 535 is assigned a unique session ID 545. Also, the new session 535 is associated with a respective instance of a kernel mode portion 550 of an operating system running on the host machine 110. A suitable example of the kernel mode portion 550 is the WIN32K kernel mode portion provided by the WINDOWS® family of operating systems. In turn, the kernel mode portion 550 for the new session 535 is associated with new instances of an output device manager 555 and an input device manager 560. Thus, the new session 535 created for a user 135 upon login includes at least respective instances of a kernel mode portion 550, an output device manager 555, and an input device manager 560.

The output device manager 555 is responsible for associating respective output devices 120 or 125 with corresponding sessions 535. The output device manager 555 also manages a list of physical output devices 120 or 125 assigned to each session 535, and tracks any changes in state or other issues related to the output devices 120 or 125. A suitable example of an output device manager 555 is the graphics device interface (GDI) layer, which is provided by the WINDOWS® operations systems to manage display devices 120.

The input device manager 560 is responsible for associating respective input devices 115 with corresponding sessions 535. A suitable example of an input device manager 560 is the NTUSER window manager provided as part of the WINDOWS® family of operating systems.

While not shown in FIG. 5 in the interests of clarity and conciseness, other components offered as part of the WINDOWS® family of operating systems may be useful for implementing the multi-console system 100. The Client Server Runtime System (CSRSS) is a layer provided by a user mode portion of the WINDOWS subsystem. Also, a utility for automatically detecting and configuring peripheral devices, such as input devices 115, that may be connected or disconnected from the host machine 110 may also be useful. A suitable example is the Plug and Play (PnP) layer offered by the WINDOWS® family of operating systems, which can issue notifications regarding entry or exit of various input devices 115.

Figure 6:
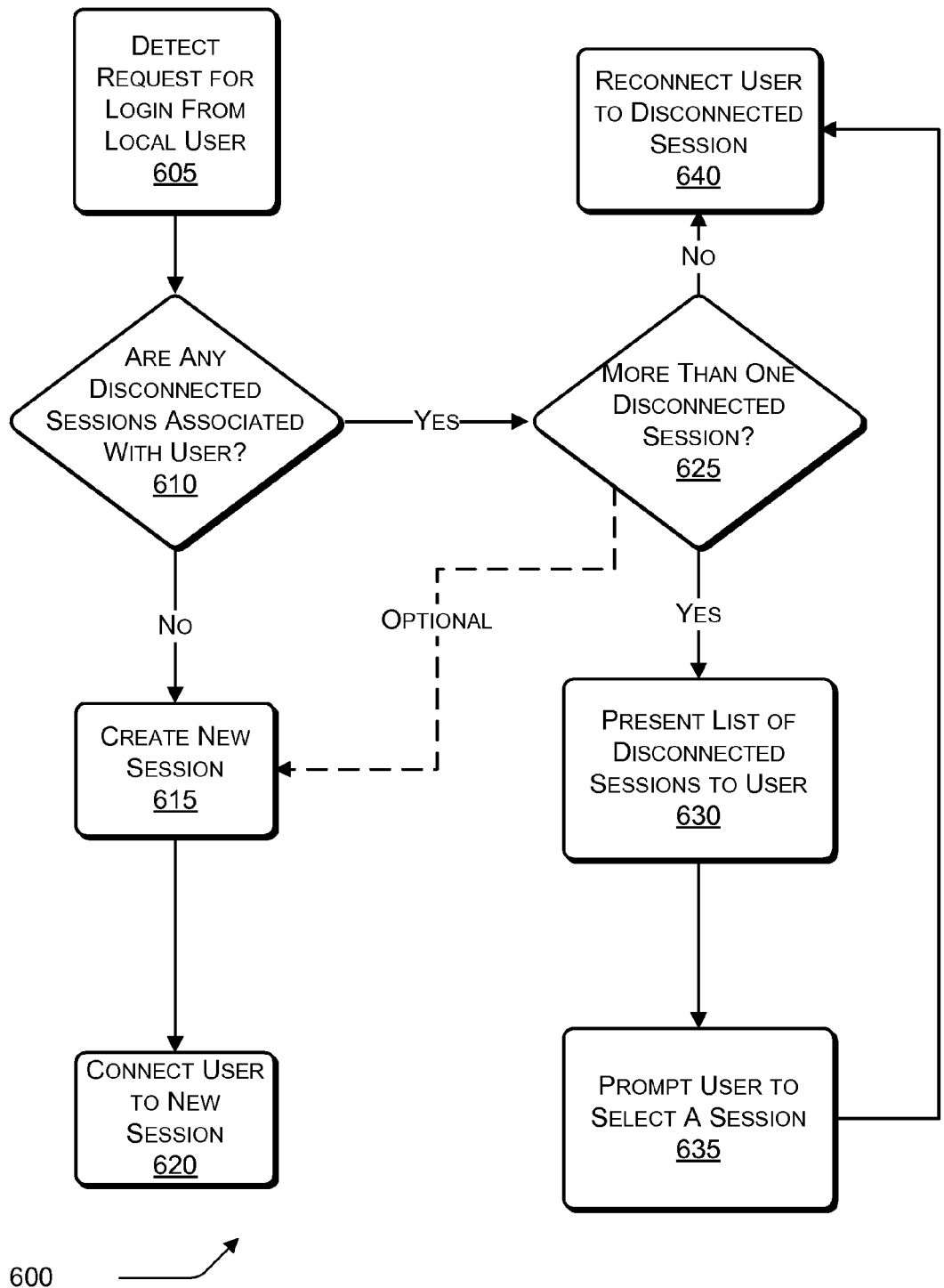
FIG. 6 is a flowchart illustrating a process performed by the multi-console system to log a local user into a session created at a given console.

FIG. 6 illustrates a process 600 performed by the multi-console system 100 to log a user 135 into a temporary session 535 created at a console 105. In block 605, the process 600 detects that a user 135 has requested to login, for example, by entering a username and password combination. In block 610, the process 600 then determines whether any disconnected sessions 535 are associated with the user 135 who is requesting to log in. If no disconnected sessions 535 are associated with the user 135 who is currently logging on, then (block 615) a new session 535 is created for the user 135, as discussed above in connection with FIG. 5. In block 620, the user 135 is connected to the new session 535.

Otherwise, if disconnected sessions 535 are associated with the user 135 (block 625), then the process 600 proceeds to block 625, where it determines how many disconnected sessions 535 are associated with the user 135. If the user 135 has only one disconnected session 535, he or she can be reconnected to this original session 535, as shown in block 640. Alternatively, as shown by the dashed line labeled "Optional" in FIG. 6, a new session 535 can be created for the user 135. In this case, the process proceeds to block 615.

If the user 135 has multiple disconnected sessions 135, the process 600 proceeds to block 630, where the user 135 is presented with a list of the disconnected sessions 535. In block 635, the process 600 prompts the user 135 to choose a session 535 with which to reconnect. Once the user 135 has selected a disconnected session 135, the process 600 reconnects the user 135 to the chosen session 135 (block 640).

As discussed below in connection with FIG. 9, when a session 535 is disconnected, a temporary session 535 is associated with the console 105 from which the session 535 was disconnected. When a user 135 logs off the multi-console system 100 completely, as opposed to disconnecting from a session 535, the terminal manager 520 creates a temporary session 535 and attaches it to the console 105, as discussed above in connection with FIG. 4. An alternative approach is not to reset the session 535 completely, but just logoff the current user 135, so that the session 535 will move from an Active state to a Connected state.

In block 615 of FIG. 6, when a new session 535 is created, this new session 535 can take the form of the temporary session 535 that was previously attached to the console 105. Also, the new session 535 created in block 410 of FIG. 4 can take the form of this temporary session 535. Finally, as an optimization, the sessions 535 can be pre-created on each of the consoles 105 configured as part of the multi-console system 100, so that the sessions are ready and waiting for the users 135. In this optimized scenario, the user 135 need not wait for the session 535 to be created before logging in: by pre-creating the session 535 ahead of time, the overhead associated with creating the session 535 has been completed when the user requests to log in, and the user 135 need not wait for this overhead when logging in.

Using the process and data flows shown in FIGS. 4 and 5, the new session 535, or the reconnected session 535, attached to the console 105 is associated with the set of input devices 115 and output devices 120 and 125 that are specified for that console 105 by the registry 215. The terminal manager 520 can read this data from the registry 215, and notify the input device manager 560 and the output device manager 555 which input devices 115 and output devices 120 and 125 belong to the console 105. Alternatively, the output device manager 555 and the input device manager 560 can read the registry 215 themselves directly.

Figure 7:
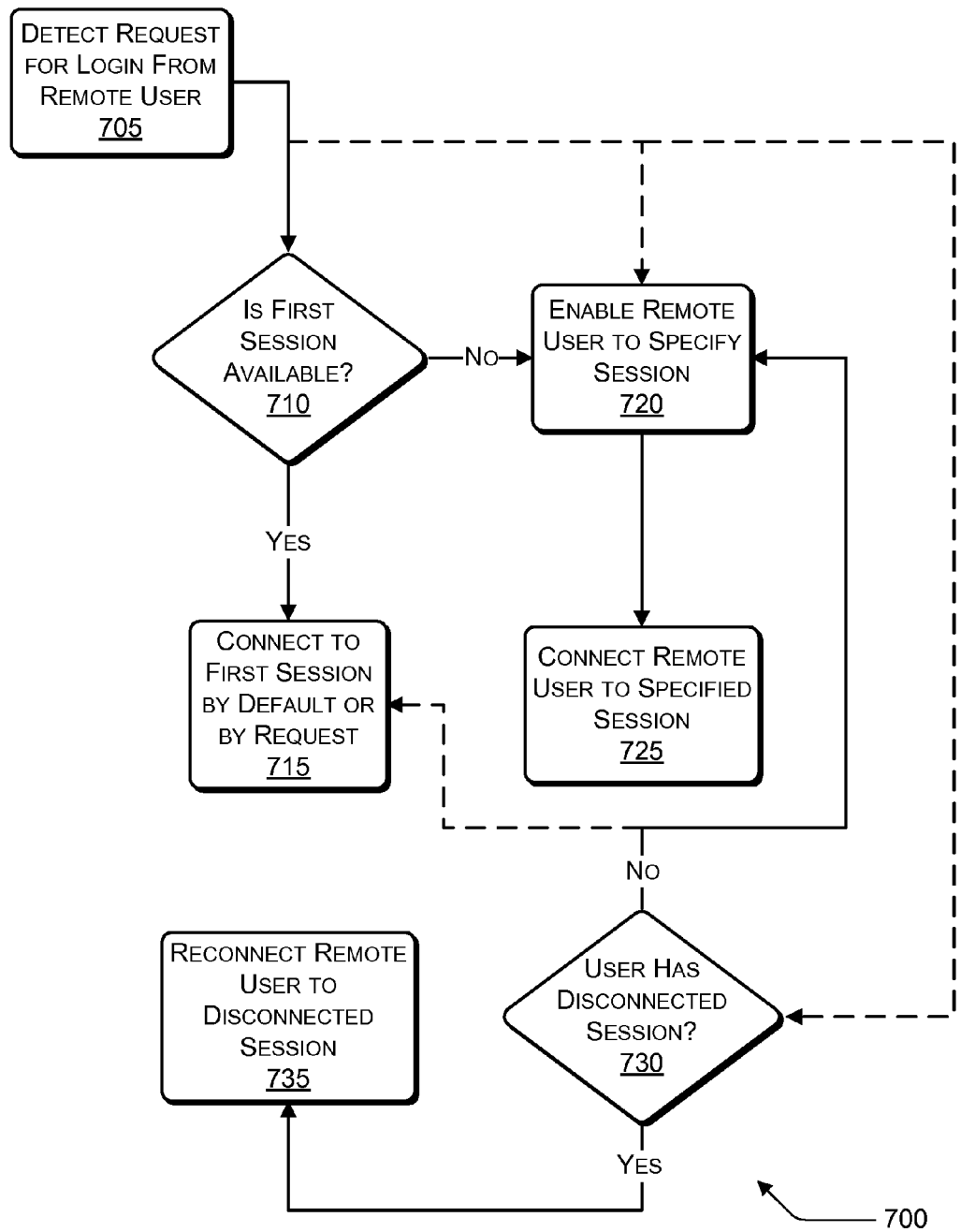
FIG. 7 is a flowchart illustrating a process by which the multi-console system enables users to connect remotely to sessions supported by the host machine.

FIG. 7 illustrates a process 700 by which the multi-console system 100 enables users 135 to connect remotely to sessions 535 supported by the host machine 110. In block 705, the process 700 detects that a remote user 135 has requested to log in to the multi-console system 100. For example, the remote user 135 may submit a username and password combination to the login process 515 shown in FIG. 5.

Once the login request has been received, the process 700 determines which of the multiple sessions 535 supportable by the host machine 110 to connect to the remote user 135. One approach is to determine whether the first interactive session 535 is available when the remote user 135 requests to log in (block 710). If the first interactive session 535 is available, the remote user 135 can be connected to it by default, without further action by the remote user 135 (block 715). If the first interactive session 535 is not available, the process 700 can proceed to block 720, where the process 700 enables the remote user 135 to specify a particular session 535 to which to connect. In block 725, the user 135 is connected to the specified session 535.

Another approach is for the process 700 to present the user 135 with a list of available sessions 535, and prompt the remote user 135 to select a session 535 to which he or she wants to connect. This option bypasses decision block 710, and disregards the issue of whether the first interactive session 535 is available. This process flow is represented in FIG. 7 by the dashed line connecting blocks 705 and 720. In this case, the process 700 connects the remote user to the selected or specified session in block 725.

Another approach is to determine whether the remote user 135 is associated with any disconnected sessions 535 on the host machine 110 (block 730). This option, once again, bypasses decision block 710, and disregards the issue of whether the first interactive session 535 is available. This process flow is represented in FIG. 7 by the dashed line connecting blocks 705 and 730. If the user 135 has disconnected sessions 535 on the host machine 110, the process 700 can reconnect the remote user 135 to the disconnected session 535 (block 735). If the user has no disconnected session 535, the process 700 can proceed to block 720 or to block 715.

Remote reconnection to sessions 535 can be performed similarly to local connection to sessions 535, as discussed above. If a given user 135 is logged in locally at a given console 105, disconnects, and then logs on again from a remote location, he can be reconnected to his original session 535.

Yet another approach is to enable the remote user 135 to start a new session 535 instead of reconnecting to the previous session 535, if desired. This approach was discussed above in connection with FIG. 6.

When a user 135 who is logged into a session 535 at a local console 105 disconnects the session 535, a temporary session 535 is created at that local console 105 to await a login from another user 135. The temporary session 535 created at the local console 105 takes over those output devices 120 and 125 and input devices 115 associated with that local console 105. Again, the terminal manager 520 can read the appropriate entries for this console 105 from the registry 215 and inform the input device manager 560 and the output device manager 555 for the temporary session 535 accordingly. Alternatively, the input device manager 560 and the output device manager 555 for the temporary session 535 can read the registry 215 directly for themselves.

Figure 8:
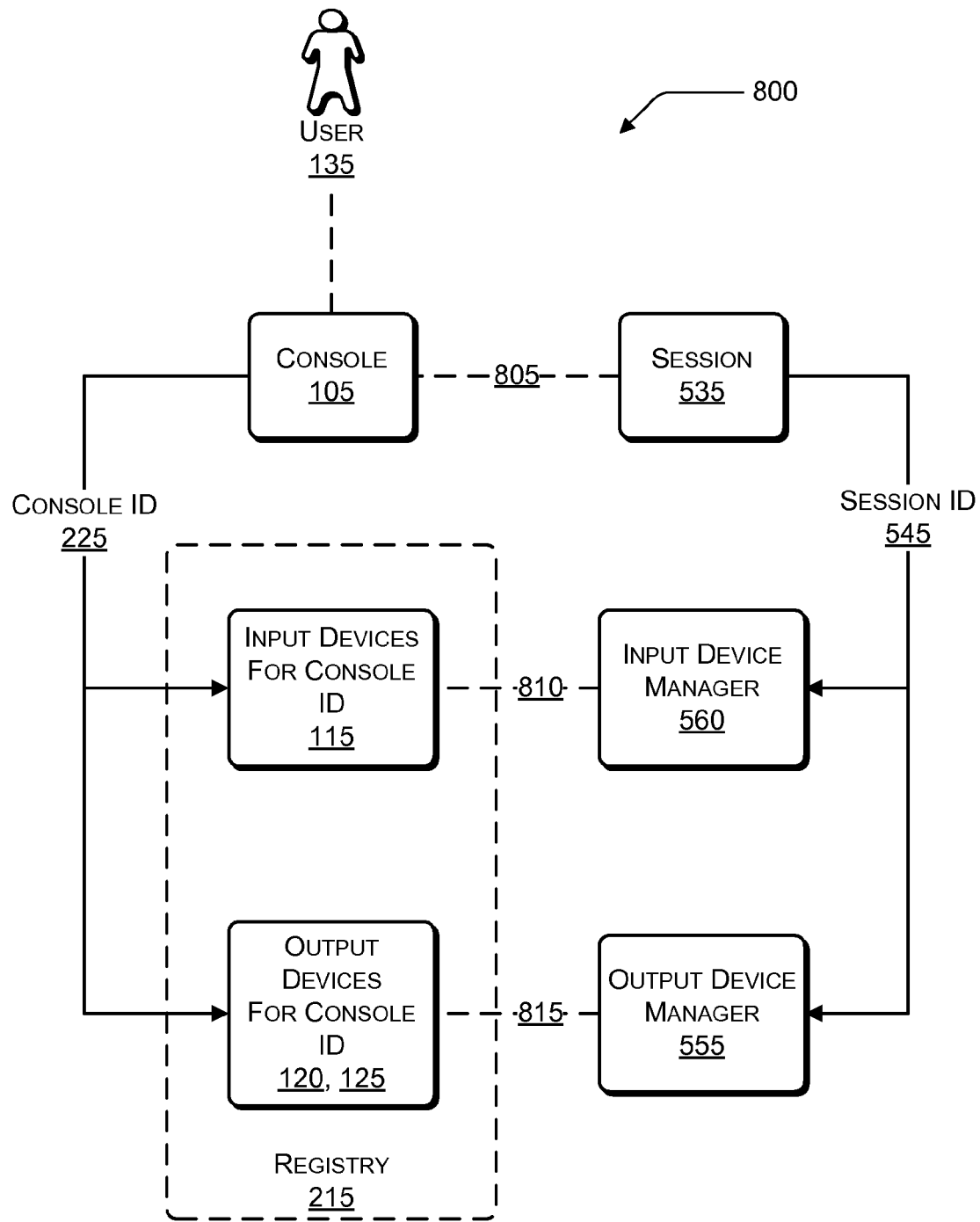
FIG. 8 illustrates a state of the multi-console system after a user logs into a session at a given console.

FIG. 8 illustrates a state 800 of the multi-console system 100 after a user logs in to a session 535 at a given console 105. The console 105 used by the user 135 is represented by the unique console ID 225, which points to entries in the registry 215 for the input devices 115 and output devices 120 or 125 associated with the console 105. Once the new session 535 is created for the user 135 after login, the new session 535 is associated with the console 105 at which the user 135 is logged in, as indicated by the line 805. A unique session ID 545 is associated with the new session 535, and the session ID 545 points to the new processes created for the new session 535. FIG. 8 shows only the input device manager 560 and the output device manager 555. Other aspects of the host machine 110 and/or the operating system running thereon are omitted from FIG. 8 for clarity and conciseness, but could be included in implementations of the multi-console system 100 without departing from the scope of the teachings herein.

In any event, the input device manager 560 is associated with the input devices 115 assigned to the console 105, as indicated by the line 810, and the output device manager 555 is associated with the output devices 120 and 125 assigned to the console, as indicated by the line 815. Assuming the teachings herein are implemented in an object-oriented environment, the various components shown in FIG. 8 could be instantiated as respective objects having attributes and relationships as illustrated.

It is also noted that the data state 800 shown in FIG. 8 could also describe the structure resulting after the temporary sessions 535 are created for each of the consoles 105 after startup of the host machine 110. Also, if the sessions 535 are pre-created prior to user login, as discussed above as an optimization, then the data state 800 could also describe the structure resulting after such pre-creation.

Figure 9:
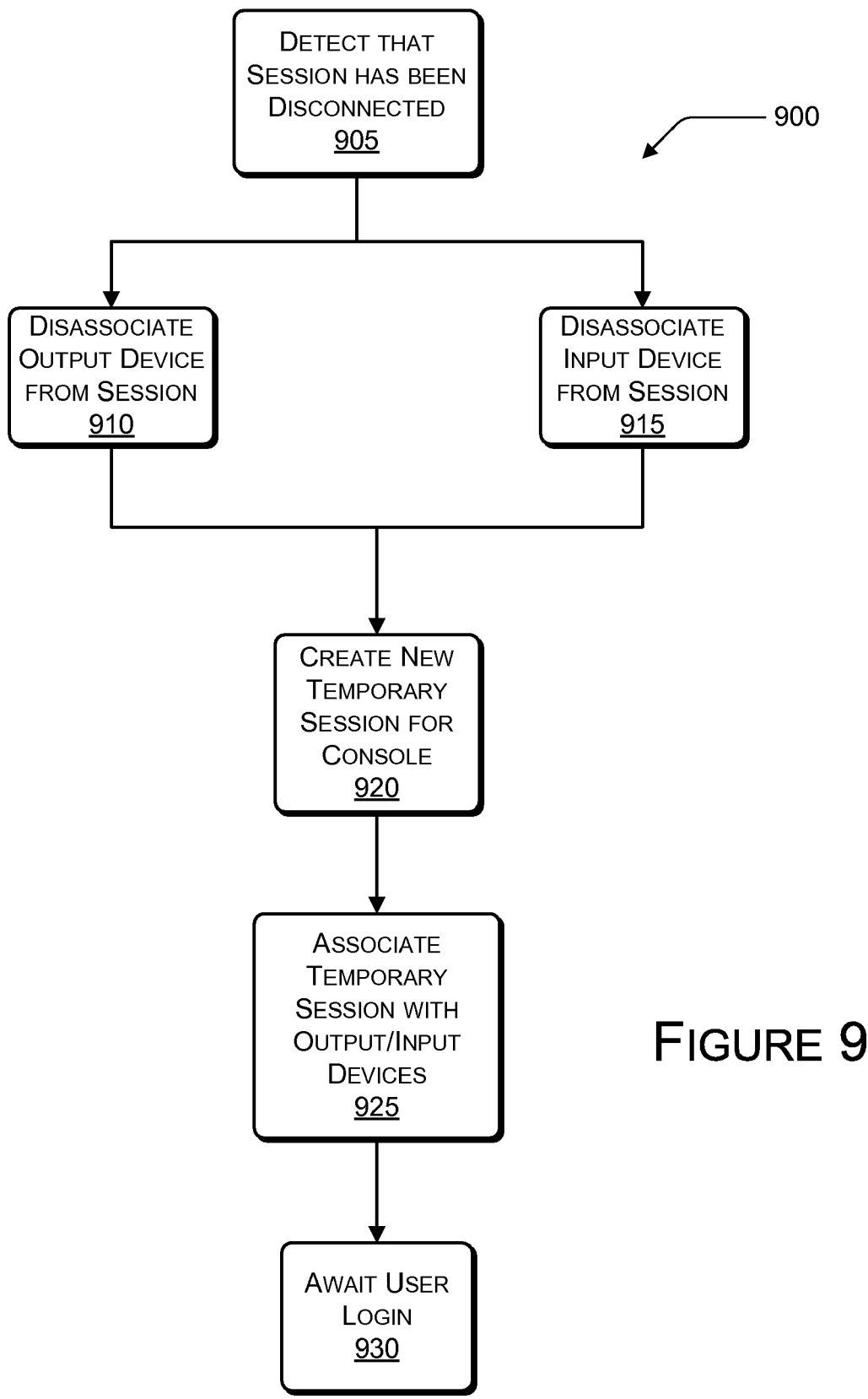
FIG. 9 is a flowchart illustrating a process performed by the multi-console system when a session connected to a console is disconnected.

FIG. 9 illustrates a process 900 performed by the multi-console system 100 should a session 535 connected to a console 105 be disconnected. In block 905, the terminal manager 520 associated with the console 105 detects that the session 535 has assumed a disconnected state as indicated by, for example, by a user 135 logging out from the given console 105, or the user 135 disconnecting a remote session 535 supported by the multi-console system 100. The terminal manager 520 detects that this session 535 has become disconnected, and notifies the output device manager 555 and input device manager 560 associated with the disconnected session 535 accordingly.

In block 910, in response to this notification from the terminal manager 520, the output device manager 555 disassociates the physical output devices 120 and 125 that were formerly associated with the now-disconnected session 535. In place of the output devices 120 and 125, the output device manager 555 attaches a disconnect display device such as the Terminal Server Disconnect Display Driver (TSDDD) to the disconnected session 535.

In block 915, also in response to this notification from the terminal manager 520, the input device manager 560 dereferences the input devices 115 that were formerly associated with the now-disconnected session 535.

FIG. 9 shows processes 910 and 915 as proceeding in parallel for convenience in illustration and discussion. However, it is noted that these processes 910 and 915 could proceed in any order or sequence deemed suitable in a given application, whether serially, in parallel, or any combination of the foregoing.

In block 920, a temporary session 535 as discussed above is created by, for example, the terminal manager 520. In block 905, this temporary session 535 is associated with the console 105 from which the session 535 was disconnected. In block 925, the input devices 115 and output devices 120 and 125 formerly associated with the disconnected session 535 are now associated with the temporary session 535, for example by appropriate entries in the registry 215. In block 930, this temporary session 535 then awaits a login either from a new user 135, or possibly a reconnection from the same user 135 who disconnected earlier.

Figure 10:
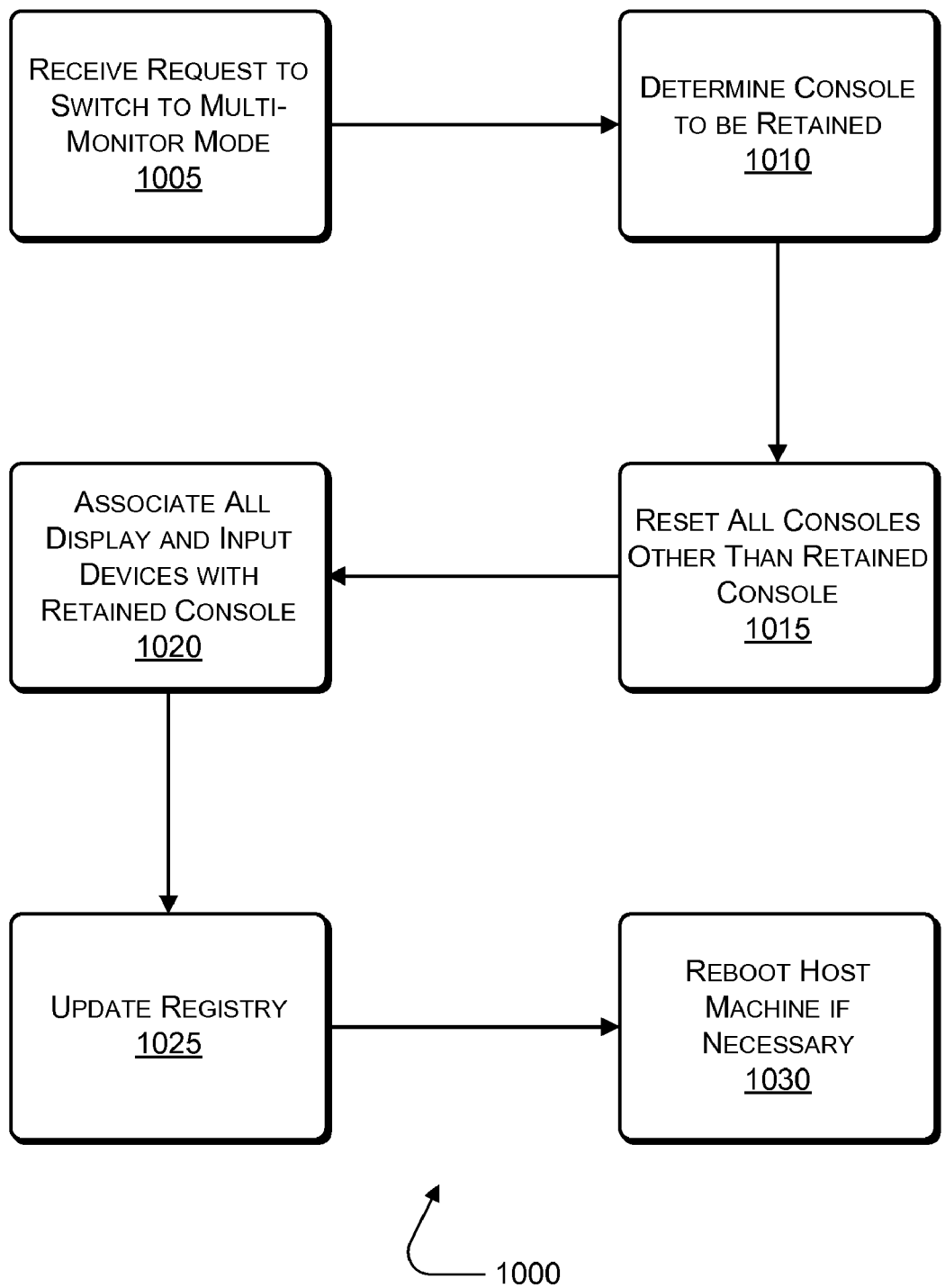
FIG. 10 is a flowchart illustrating a process performed by the multi-console system to switch from a multi-console mode to a single console, multi-monitor mode.

FIG. 10 illustrates a process 1000 performed by the multi-console system 100 to switch from a multi-console mode to a single console, multi-monitor mode. In block 1005, the process 1000 receives a request to switch modes. To promote system security and integrity, the right to switch modes can be restricted to admins 130 only, or can be restricted to users 135 who have the appropriate authority or permission level to reconfigure the multi-console system 100.

Having received the request to switch modes, and having determined that the request is valid and/or authorized, in block 1010 the process 1000 determines which of the consoles 105 should be retained when the multi-console system 100 switches to single-console, multi-monitor mode. An example of single-console, multi-monitor mode is when a given computer system provides access to only one user 135 at a given time. Thus, this given computer system can be described as operating in a single-console mode. However, the given computer system enables that one user 135 to control and view more than one monitor from this single console.

Accordingly, the given computer system can be described as operating in single-console, multi-monitor mode.

In different embodiments of the process 1000, the admin 130 can specify which console 105 should be retained on a case-by-case basis, or can specify that the console from which the request originates should be retained.

In other embodiments, one particular console 105 can be retained by default, regardless of whence the request to switch modes originates. Where a request to switch modes is received from an authorized user 135 or admin 130 who is logged into a local console 105, the local console 105 from which the request is received may be retained by default. Where the request to switch modes is received from an authorized user 135 or admin 130 who is logged in remotely, the admin 130 may specify which local console 105 is to be retained.

In any event, once the console 105 to be retained is identified, all other console 105 are reset so that they no longer exist from the viewpoint of the multi-console system 100 (block 1015). To illustrate the process 1015, assume for the sake of discussion that the request to switch modes originated from a local console "A". All console sessions 535 other than the session from which the request originated (i.e., Session "A") are reset. After the reset, all input devices 115 and output devices 120 and 125 associated with those sessions 535 become available to the one remaining session 535, or they can remain unattached to any session, depending on how configurations are specified.

In block 1020, all output devices 120 and 125 and input devices 115 connected to the host machine 110 are associated with the console 105 that was designated for retention above in block 1010. In the example above, this association can be performed by the terminal manager 520 informing the output device manager 555 of the Session "A" to enumerate all output devices 120 and 125 connected to the host machine 110 and to associate them with Session "A". Similarly, the terminal manager 520 can inform the input device manager 560 to enumerate all input devices 115 connected to the host machine 110 and associate them with Session "A". The registry 215 is then updated accordingly to reflect this association (block 1025). In block 1030, the host machine 110 is rebooted or restarted, if necessary. The host machine 110 is now in single-session, multi-monitor mode.

Figure 11:
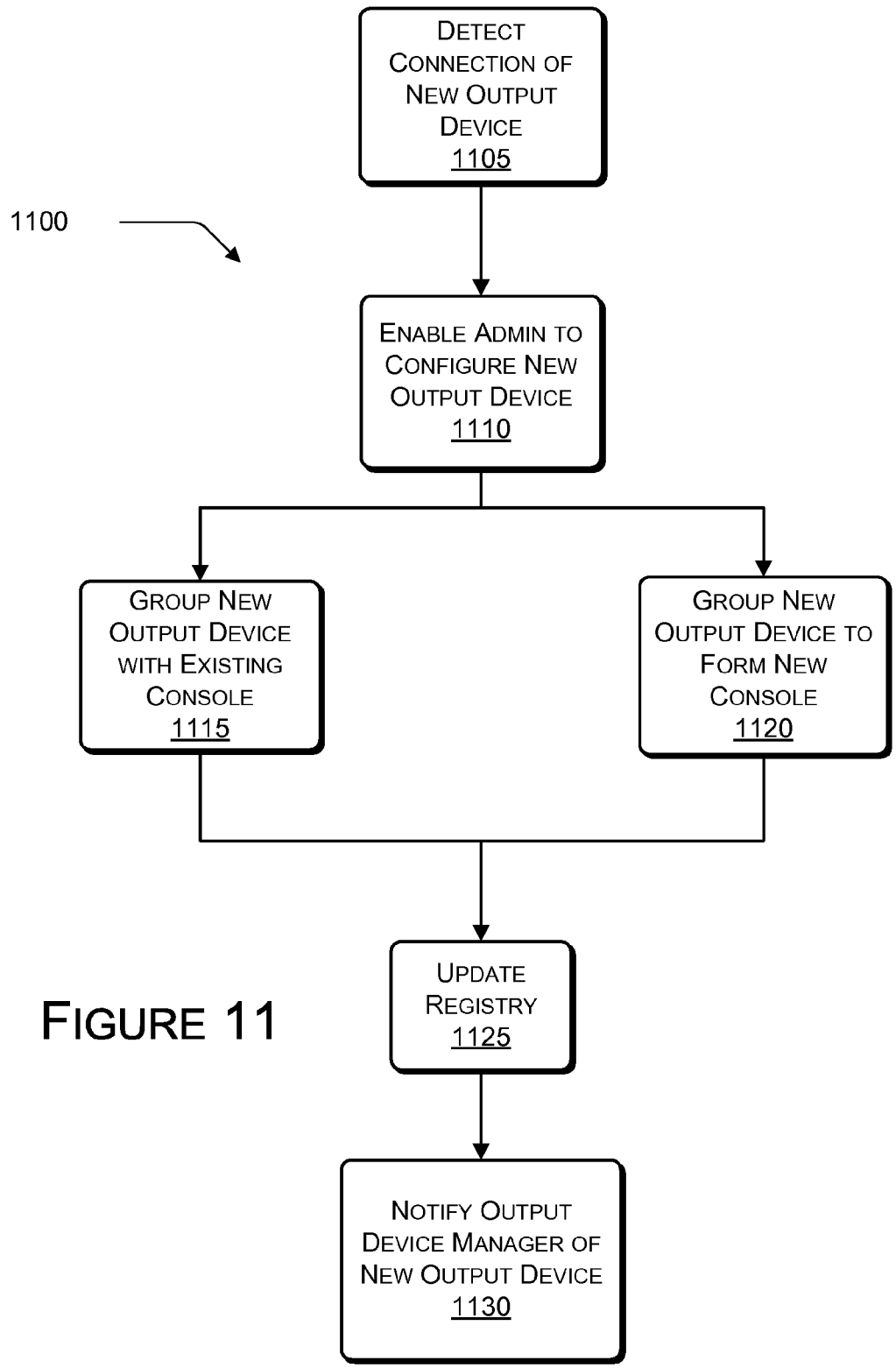
FIG. 11 is a flowchart illustrating a process performed by the multi-console system should a new output device be connected to the host machine.

FIG. 11 illustrates a process 1100 performed by the multi-console system 100 should a new output device 120 or 125 be connected to the host machine 110. For example, but not limitation, new output devices 120 or 125 can include video cards, monitors or other display devices, speakers, headphones, or the like. When a new output device 120 or 125 is added to the host machine 110 and detected (block 1105), the new output device 120 or 125 is associated with either a new console 105 or an existing console 105. Until then, existing sessions 535 running on any console 105 are not made aware of the new output device 120 or 125, and do not open a reference to the output device 120 or 125.

In block 1110, the process 1100 enables the admin 130 to configure these new devices into the multi-console system 100. To do so, the admin 130 opens the configuration tool 205. Using the configuration tool 205, the admin 130 can add the new output device 120 or 125 to an existing console 105 as an additional output device 120 or 125 (block 1115). Alternatively, the admin 130 can group the new output device 120 or 125 with a given set of input devices 115 (e.g., a keyboard-mouse pair) to define a new console 105 (block 1120). In the latter case, the existing console 105 to which the new output device 120 or 125 is added may be viewed as a multi-monitor console.

It is noted that the numbering and arrangement of the blocks 1115 and 1120 are chosen for convenience in illustration and discussion, and not to suggest any preference for either scenario represented in those two blocks.

In block 1125, the registry 215 is updated as appropriate to indicate that the new output device 120 or 125 is associated with the console 105 as designed in blocks 1115 or 1120 above. In block 1130, the process 1100 notifies the output device manager 555 for a session 535 running on the console 105 that the new output device 120 or 125 is now available to that session 535.

Figure 12:
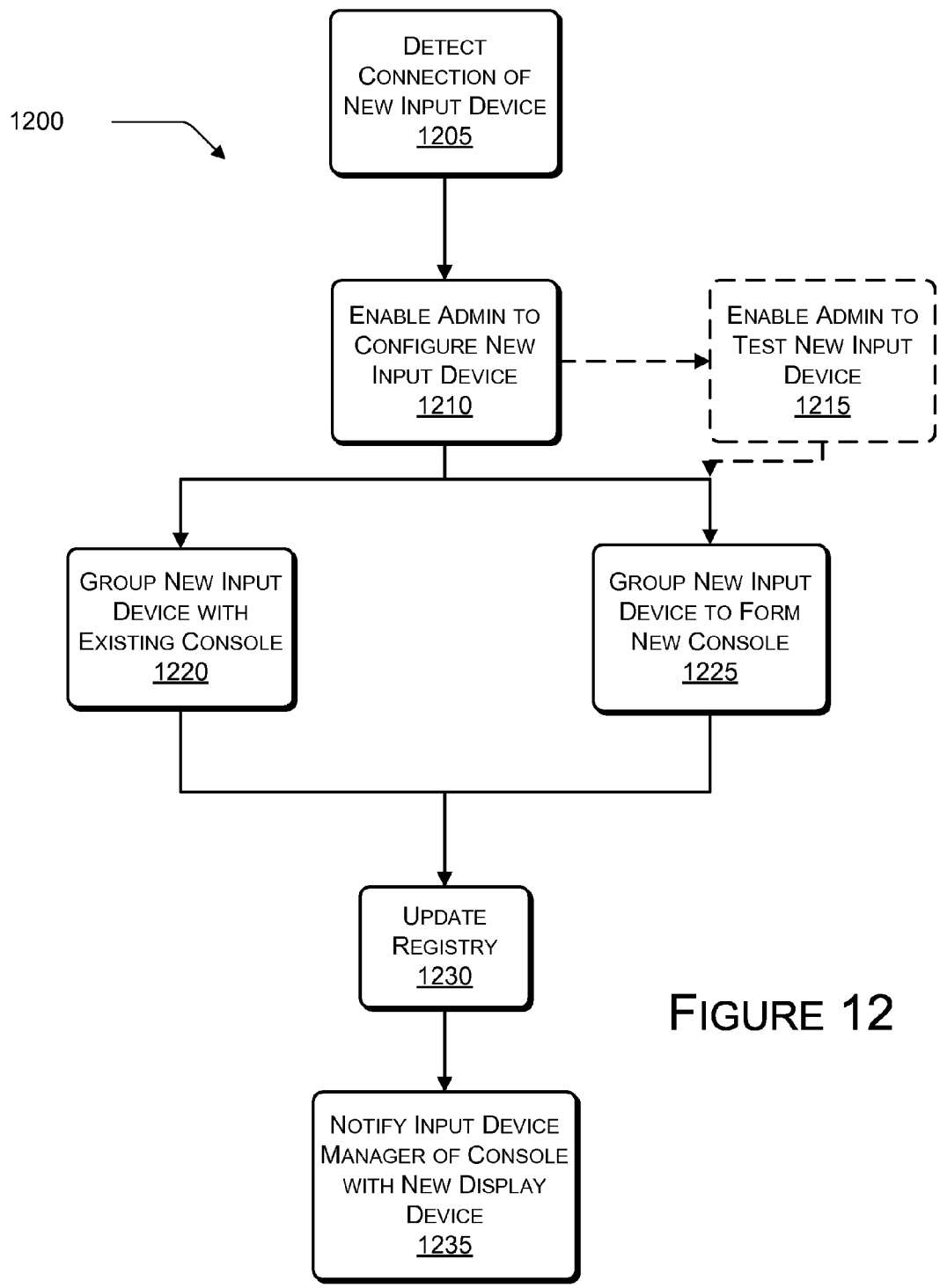
FIG. 12 is a flowchart illustrating a process performed by the multi-console system should a new input device be connected to the host machine.

FIG. 12 illustrates a process 1200 performed by the multi-console system 100 should a new input device 115 be connected to the host machine 110. A utility such as the PnP layer discussed above may detect the connection of the new input device 115 and may notify all sessions 535 that the new input device 115 has been connected. However, until the new input device 115 has been configured by the admin 130, the sessions 535 ignore it. In block 1210, the process 1200 enables the admin 130 to execute the configuration tool 205 to configure the new input device 115.

In some embodiments of the multi-console system 100, the new input device 115 can be made visible to a session 535 used by the admin 130 so that the admin 130 can test the operation of the new input device 115, as indicated by the dashed lines appearing in FIG. 12 in connection with block 1215.

In any event, turning to blocks 1220 and 1225, the admin 130 either groups the new input device 115 with an output devices 120 or 125 to form a new console 105 (block 1225), or adds the new input device 115 to an existing console 105 to provide this console 105 with an additional input device 115 (block 1220). In block 1230, the registry 215 is updated to associate the new input device 115 to the console selected above in block 1220 or 1225. In block 1235, the process 1200 notifies the input device manager 555 for the console 105 to which the new input device 115 is assigned that the new input device 115 s available.

The multi-console system 100 can also support the connection of new input device 115, such as scanners, digital cameras, webcams, microphones, or the like to the host machine 110. When such input devices 115 are initially connected to the host machine 110, a utility such as the PnP layer can detect the connection of the new input device 115 and send a device discovery notification to all consoles 105 supported by the host machine 110. Alternatively, the PnP layer can send the device discovery notification to only one console 105, such as a primary console 105 from which the admin 130 configured the multi-console system 100 initially. After this notification, the admin 130 can open the configuration tool 205 and associate the new input device 115 with other consoles 105 as appropriate.

FIG. 13 illustrates an exemplary computing environment 1300 within which systems and methods for implementing multi-console workstations 100, as well as the computing, network, and system architectures described herein, can be either fully or partially implemented. For example, the environment 1300 shown in FIG. 13 may be suitable for constructing the host machine 110 disclosed herein. Exemplary computing environment 1300 is only one example of a computing system and is not intended to suggest any limitation as to the scope of use or functionality of the architectures. Neither should the computing environment 1300 be interpreted as having any dependency or requirement relating to any one or combination of components illustrated in the exemplary computing environment 1300.

The computer and network architectures in computing environment 1300 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 1300 includes a general-purpose computing system in the form of a computing device 1302. The components of computing device 1302 can include, but are not limited to, one or more processors 1304 (e.g., any of microprocessors, controllers, and the like), a system memory 1306, and a system bus 1308 that couples the various system components. The one or more processors 1304 process various computer executable instructions to control the operation of computing device 1302 and to communicate with other electronic and computing devices. The system bus 1308 represents any number of several types of bus structures, including a memory bus or memory controller, a peripheral bus, an accelerated graphics port, and a processor or local bus using any of a variety of bus architectures.

Computing environment 1300 includes a variety of computer readable media which can be any media that is accessible by computing device 1302 and includes both volatile and non-volatile media, removable and non-removable media. The system memory 1306 includes computer readable media in the form of volatile memory, such as random access memory (RAM) 1310, and/or non-volatile memory, such as read only memory (ROM) 1312. A basic input/output system (BIOS) 1314 maintains the basic routines that facilitate information transfer between components within computing device 1302, such as during start-up, and is stored in ROM 1312. RAM 1310 typically contains data and/or program modules that are immediately accessible to and/or presently operated on by one or more of the processors 1304.

Computing device 1302 may include other removable/non-removable, volatile/non-volatile computer storage media. By way of example, a hard disk drive 1316 reads from and writes to a non-removable, non-volatile magnetic media (not shown), a magnetic disk drive 1318 reads from and writes to a removable, non-volatile magnetic disk 1320 (e.g., a "floppy disk"), and an optical disk drive 1322 reads from and/or writes to a removable, non-volatile optical disk 1324 such as a CD-ROM, digital versatile disk (DVD), or any other type of optical media. In this example, the hard disk drive 1316, magnetic disk drive 1318, and optical disk drive 1322 are each connected to the system bus 1308 by one or more data media interfaces 1326. The disk drives and associated computer readable media provide non-volatile storage of computer readable instructions, data structures, program modules, and other data for computing device 1302.

Any number of program modules can be stored on RAM 1310, ROM 1312, hard disk 1316, magnetic disk 1320, and/or optical disk 1324, including by way of example, an operating system 1328, one or more application programs 1330, other program modules 1332, and program data 1334. Each of such operating system 1328, application program(s) 1330, other program modules 1332, program data 1334, or any combination thereof, may include one or more embodiments of the systems and methods described herein.

Computing device 1302 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 1302 via any number of different input devices such as a keyboard 1336 and pointing device 1338 (e.g., a "mouse"). Other input devices 1340 (not shown specifically) may include a microphone, joystick, game pad, controller, satellite dish, serial port, scanner, and/or the like. These and other input devices are connected to the processors 1304 via input/output interfaces 1342 that are coupled to the system bus 1308, but may be connected by other interface and bus structures, such as a parallel port, game port, and/or a universal serial bus (USB).

A display device 1344 (or other type of monitor) can be connected to the system bus 1308 via an interface, such as a video adapter 1346. In addition to the display device 1344, other output peripheral devices can include components such as speakers (not shown) and a printer 1348 which can be connected to computing device 1302 via the input/output interfaces 1342.

Computing device 1302 can operate in a networked environment using logical connections to one or more remote computers, such as remote computing device 1350. By way of example, remote computing device 1350 can be a personal computer, portable computer, a server, a router, a network computer, a peer device or other common network node, and the like. The remote computing device 1350 is illustrated as a portable computer that can include any number and combination of the different components, elements, and features described herein relative to computing device 1302.

Logical connections between computing device 1302 and the remote computing device 1350 are depicted as a local area network (LAN) 1352 and a general wide area network (WAN) 1354. Such networking environments are commonplace in offices, enterprise-wide computer networks, intranets, and the Internet. When implemented in a LAN networking environment, the computing device 1302 is connected to a local network 1352 via a network interface or adapter 1356. When implemented in a WAN networking environment, the computing device 1302 typically includes a modem 1358 or other means for establishing communications over the wide area network 1354. The modem 1358 can be internal or external to computing device 1302, and can be connected to the system bus 1308 via the input/output interfaces 1342 or other appropriate mechanisms. The illustrated network connections are merely exemplary and other means of establishing communication link(s) between the computing devices 1302 and 1350 can be utilized.

In a networked environment, such as that illustrated with computing environment 1300, program modules depicted relative to the computing device 1302, or portions thereof, may be stored in a remote memory storage device. By way of example, remote application programs 1360 are maintained with a memory device of remote computing device 1350. For purposes of illustration, application programs and other executable program components, such as operating system 1328, are illustrated herein as discrete blocks, although it is recognized that such programs and components reside at various times in different storage components of the computing device 1302, and are executed by the one or more processors 1304 of the computing device 1302.

Although embodiments for preconditioning the stochastic simulation of computer system performance have been described in language specific to structural features and/or methods, it is to be understood that the subject of the appended claims is not necessarily limited to the specific features or methods described. Rather, the specific features and methods are disclosed as illustrative implementations for preconditioning input while simulating deployments of computer software.

What is claimed is:

1. A workstation configured for concurrently supporting a plurality of users, comprising:
    a host machine selectively operable to support a single console mode allowing a single user to access all resources of the host machine, and operable to support a multi-console mode allowing the plurality of users to simultaneously access one or more applications stored on the host machine;
    a plurality of consoles directly connected to the host machine, each of the plurality of consoles configured as a separate physical console to be used by one of the plurality of users, each of the plurality of consoles having respective physical input and output devices connected to the host machine directly without a communications network therebetween, and each of the plurality of consoles having a console ID that is unique, the console ID logically defining the physical input and output devices into a console;
    a configuration tool to process configuration commands and to record data representing the consoles and the input and output devices assigned to each console, and to store the unique console ID for each console, the configuration tool also able to switch from the single console mode to the multi-console mode;
    a terminal manager configured to receive the unique console ID and to send a request to create a session, the session having a session ID pointing to processes included in the session, including an input device manager and an output device manager;
    a session manager configured to receive the request to create the new session, to create the new session, to create the session ID, and to associate the new session with one of the plurality of consoles; and
    a registry having an entry for each of the plurality of consoles, the entry storing configuration data for the respective console, the registry being accessible by the terminal manager, indexed by the console ID, and configured to return data regarding the input and output devices of each console.

2. The workstation of claim 1, wherein the host machine comprises a personal computer (PC).

3. The workstation of claim 1, wherein the single console mode is configured as a multi-monitor mode.

4. The workstation of claim 1, wherein the session also includes kernel mode portion.

5. The workstation of claim 1, wherein the input device manager is configured for operation of a keyboard and the output device manager for visual output device.

6. The workstation of claim 1, wherein a plurality of sessions is pre-created prior to user login.

7. The workstation of claim 1, wherein:
    a temporary session is created in response to a user disconnecting from a session; and
    the temporary session awaits a login from a new user or the disconnecting user.

8. The workstation of claim 1, wherein the host machine is equipped with at least two visual output devices, two keyboards and two mice.

9. A method for configuring a host machine, comprising:
    operating the host machine to selectively support a single console mode allowing a single user to access all resources of the host machine or support a multi-console mode allowing a plurality of users to simultaneously access one or more applications stored on the host machine;
    configuring a plurality of consoles to connect to the host machine, each of the plurality of consoles configured as a separate physical console to be used by one of the plurality of users, each of the plurality of consoles having respective physical input and output devices connected to the host machine directly without a communications network therebetween, and each of the plurality of consoles having a console ID that is unique, the console ID logically defining the physical input and output devices into a console;
    processing configuration commands and to record data representing the consoles and the input and output devices assigned to each console, and to store the unique console ID for each console, the configuration commands also useable to switch from the single console mode to the multi-console mode;
    receiving the unique console ID at a terminal manager configured to send a request to create a session, the session having a session ID pointing to processes included in the session, including an input device manager and an output device manager;
    receiving the request to create the new session, creating the new session, creating the session ID, and associating the new session with one of the plurality of consoles; and
    configuring a registry to have an entry for each of the plurality of consoles, the entry storing configuration data for the respective console, the registry being accessible by the terminal manager, indexed by the console ID, and configured to return data regarding the input and output devices of each console.

10. The method of claim 9, wherein processing configuration commands comprises processing commands from a configuration tool.

11. The method of claim 9, wherein receiving the request to create the new session is performed by a session manager.

12. The method of claim 9, wherein creating the session creates a session including a kernel mode portion.

13. The method of claim 9, wherein the input device manager is configured for operation of a keyboard and the output device manager is configured for operation of a visual output device.

14. The method of claim 9, wherein a plurality of sessions is pre-created prior to user login.

15. The method of claim 9, additionally comprising:
    creating a temporary session in response to a user disconnecting from a session; and
    awaiting a login to the temporary session by a new user or the disconnecting user.

16. The method of claim 9, wherein operating the host machine comprises operating a workstation equipped with at least two visual output devices, two keyboards and two mice.

* * * * *

UNITED STATES PATENT AND TRADEMARK OFFICE
CERTIFICATE OF CORRECTION

| | | |
|---|---|---|
| PATENT NO. | : 8,015,331 B2 | Page 1 of 1 |
| APPLICATION NO. | : 11/171005 | |
| DATED | : September 6, 2011 | |
| INVENTOR(S) | : Sriram Sampath et al. | |

It is certified that error appears in the above-identified patent and that said Letters Patent is hereby corrected as shown below:

In column 2, line 6, after "or" delete "to".

Signed and Sealed this
Eighth Day of November, 2011

David J. Kappos
*Director of the United States Patent and Trademark Office*